(12) United States Patent
Marupaduga

(10) Patent No.: US 11,399,306 B1
(45) Date of Patent: Jul. 26, 2022

(54) DYNAMIC ENABLEMENT OF USER SPECIFIC FEATURES IN A DUAL CONNECTIVITY NETWORK

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

(21) Appl. No.: 17/061,083

(22) Filed: Oct. 1, 2020

(51) Int. Cl.
*H04W 4/00* (2018.01)
*H04W 28/02* (2009.01)
*H04W 76/15* (2018.01)
*H04W 24/08* (2009.01)
*H04W 64/00* (2009.01)

(52) U.S. Cl.
CPC ....... *H04W 28/0268* (2013.01); *H04W 24/08* (2013.01); *H04W 64/00* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 2015/0358477 | A1* | 12/2015 | Jeong | H04W 40/24 370/259 |
| 2018/0084435 | A1* | 3/2018 | Scanferla | H04W 24/02 |
| 2019/0394820 | A1* | 12/2019 | Patil | H04W 48/20 |

\* cited by examiner

*Primary Examiner* — Suhail Khan

(57) ABSTRACT

Systems, methods, and computer-readable media herein dynamically assign user devices to communicate to cell sites and antenna arrays using either a first wireless communication protocol or a second wireless communication protocol. User devices assigned to communicate with an antenna array are monitored to determine if they are located within a desired location of the sector. If the user device is located outside of the desired location, the number of quality of service class identifiers (QCI) is determined. If the number of QCIs exceeds one, the lower priority QCIs are disabled.

20 Claims, 6 Drawing Sheets

US 11,399,306 B1

DYNAMIC ENABLEMENT OF USER SPECIFIC FEATURES IN A DUAL CONNECTIVITY NETWORK

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that employ user equipment location information and information related to quality of service class identifiers, which dynamically combat the negative impacts on user equipment in undesired areas of the cell site.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
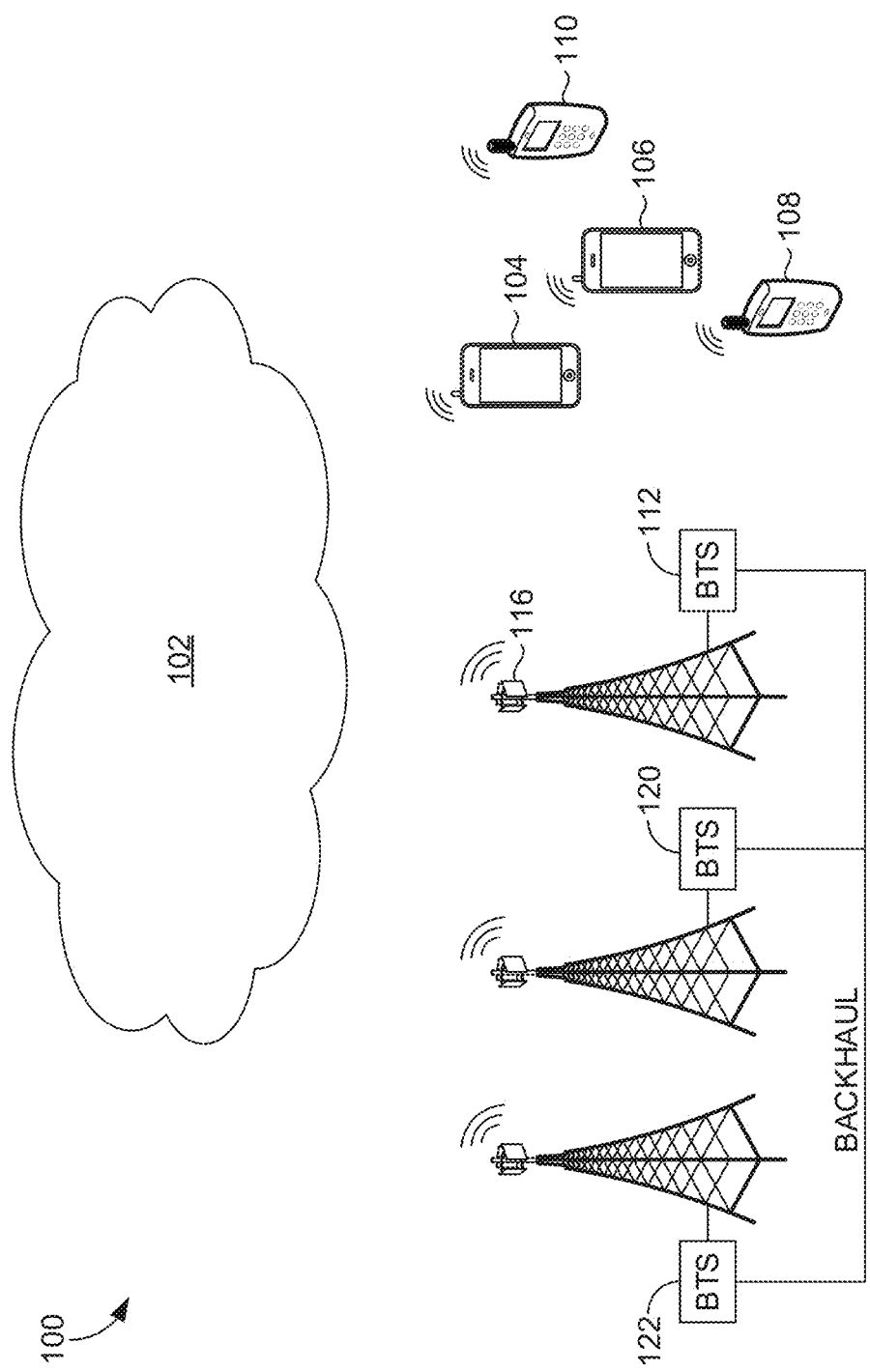
FIG. 1 depicts a schematic for an exemplary device, in accordance with an embodiment of the present invention.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AWS | Advanced Wireless Services |
| BRS | Broadband Radio Service |
| BTS | Base Transceiver Station |
| CDMA | Code Division Multiple Access |
| EBS | Educational Broadband Services |
| eNodeB | Evolved Node B |
| EVDO | Evolution-Data Optimized |
| gNodeB | Next Generation Node B |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| PCS | Broadband Personal Communications Service |
| RNC | Radio Network Controller |
| SyncE | Synchronous Ethernet |
| TDM | Time-Division Multiplexing |
| VOIP | Voice Over Internet Protocol |
| WAN | Wide Area Network |
| WCS | Wireless Communications Service |
| WiMAX | Worldwide Interoperability for Microwave Access |

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention employ the location of a user device and interference information. The location information describes desired and undesired locations based radio frequency power radiated outside of an antenna array's sector. These locations outside of the sector experience a high degree of interference and noise. The systems, methods, media employ this location information to dynamically combat noise and interference at a cell site. The negative impacts caused by high-powered undesired Radio Frequency radiation at a cell site may cause a re-education in quality of service for a user device in an undesired location outside of the antenna array's sector. By disabling lower priority quality of service class identifiers (QCIs) assigned to a particular user device, the quality of service for the device will be improved.

In a first aspect of the present invention, a method is provided. The method comprises determining that a wireless user device that is connected to an antenna array used to communicate at a particular cell site is located outside of a desired location. The desired location being within an antenna array's sector. The method further comprises determining that the user device has assigned to it a plurality of QCIs, each QCI is associated with a particular priority which is pre-determined. In embodiments, the method disables QCIs with lower priority, leaving only the highest priority QCI assigned to the user device.

In a second aspect of the present invention, computer-readable media is provided, the computer-readable media having computer-executable instructions embodied thereon that, when executed, perform a method. In accordance with the media, it is determined that a user device which is assigned to communicate with an antenna array is outside of a desired location, which desired location experiences a high signal to noise ratio. Once it is determined that the user device is outside of the desired location, the number of QCIs assigned to the user device and the priority for each QCI is determined. In embodiments, QCIs with lower priority are disabled, leaving only the highest priority QCI assigned to the user device.

In a third aspect of the present invention, a system is provided. The system comprises determining that a wireless user device that is connected to an antenna array used to communicate at a particular cell site is located outside of a desired location, which desired location is within an antenna array's sector. The system further comprises determining that the user device has assigned to it a plurality of QCIs, each QCI is associated with a particular priority which is pre-determined. In embodiments, the system disables QCIs with lower priority leaving only the highest priority QCI assigned to the user device.

Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current User Equipment (UE) 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and, thus, may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or, alternatively, "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements may communicate with current UE 104 and 106 using 5G technology, and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base station. For example, base station 112 communication may include legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

Figure 2:
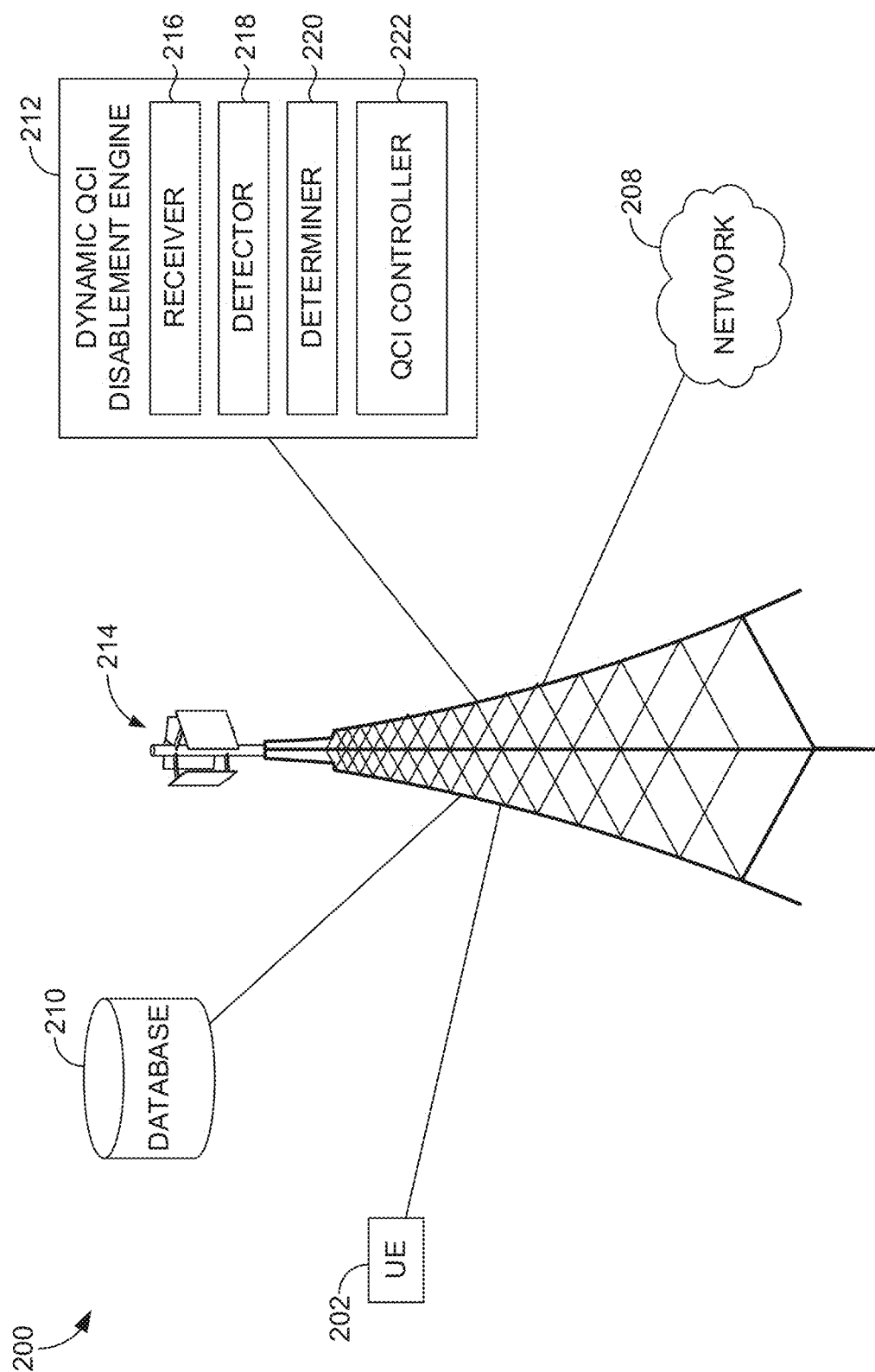
FIG. 2 depicts an exemplary telecommunications environment, in accordance with an embodiment of the present invention.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic QCI disablement engine 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, GPS device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s), and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2 and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and/or data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with the cell site 214.

In an exemplary aspect, the cell site 214 comprises a base station that serves at least one sector of the cell associated with the cell site 214 and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 214 is in communication with the dynamic QCI disablement engine 212, which comprises a receiver 216, a detector 218, a determiner 220, and a QCI controller 222. The dynamic QCI disablement engine 212 may connect UE 202 and other UEs to frequency bands within range of the UE 202 or other UEs for access to network 208. The dynamic QCI disablement engine 212 may also delay or prevent UE 202 connection to a frequency band for access to network 208. The dynamic QCI disablement engine 212 may communicate with the database 210 for storing and retrieving data.

For example, the receiver 216 may retrieve data from the UE 202, the network 208, the database 210, and the cell site 214. In some embodiments, the receiver 216 may receive requests from UEs for access to a particular frequency band. Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UE's capability, such as the number of antennas of the user device and the type of receiver used by the user device for detection. The receiver 216 may also be configured to receive information from cell sites other than cell site 214 or other processors and/or servers.

Each sector corresponds to a radiation pattern of a corresponding antenna at the cell site. The shape, size, and dimension(s) of the service coverage area of the cell site are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each of the first, second, and third antennas of the cell site, for example. The first, second, and third antennas wirelessly receive and transmit RF transmissions to and from, for example, user equipment, other antennas, other cell sites, base stations, and/or satellites, in order to facilitate communications between such devices, though not shown in FIG. 2 for clarity. In an embodiment, the first, second, and third antennas of the cell site capture two-way communications between the network and user equipment devices 202 that are within a geographic area corresponding to the service coverage area of the cell site.

Turning to detector 218, the detector 218 may detect UEs within a range, frequency bands, sector power ratios (SPRs) of frequency bands, SINRs, and loading factors (e.g., loading volume) corresponding to frequency bands, etc. Loading factors may change depending upon the day and time of day (e.g., world events such as natural disasters, terror attacks, pandemics, or religious holidays may prompt surges of UE traffic to or from specific locations), and may be stored in the database 210. Loading factors may include cell site 214 heat signature information, cell site 214 component performance information, channel quality information, or processor load measurements. Factors affecting the heat signature information of the cell site 214 include component model, component type, manufacturer, age of a component, wear and tear due to environmental factors, etc. Further, loading factors may also include an amount of current, backhaul traffic, or an anticipated current or backhaul traffic. Additionally, factors affecting loading volume may include a quantity of users connected to a frequency band or antenna properties at a time of receiving communication parameters from UEs connected to the frequency Nonprovisional Application 12573/342257 band. Other factors affecting loading volume may also include a capacity of the frequency band and data received from the quantity of users connected to the frequency band. The data received from the quantity of users may comprise a rate at which UEs are connected to and disconnected from the frequency band.

Detector 218 may also detect wireless communication protocols and wireless telecommunications networks associated with particular frequency bands. For example, the detector 218 may detect that a first wireless communication protocol of a first frequency band is a 5G wireless communication protocol and a second wireless communication protocol of a second frequency band is a 4G wireless communication protocol. Additionally, the detector 218 may detect a third wireless communication protocol of a third frequency band that comprises both a 5G and a 4G wireless communication protocol such that the network has an ability to maintain dual connectivity or a particular UE is able to connect to either 5G and 4G wireless communication protocols simultaneously.

Turning to determiner 220, the determiner 220 may determine that a UE is in an undesired portion of the sector. In some embodiments, a UE present in an undesired location within the sector may have multiple QCIs running concurrently. Determiner 220 may also determine, in response to a determination that the UE is present in an undesired location, that the particular UE has multiple applications running and is using multiple QCIs. This determination may be based on an evaluation of the SPR value for the entire sector. Determiner 220 may determine, in response to an undesired location and multiple QCIs running that the SINR value exceeds a threshold value.

Determiner 220 may also determine the priority of each QCI running on a particular UE. Every QCI is associated with a priority level. Priority level 0.5 is the highest priority level. If congestion is encountered, the lowest priority level QCI would be discarded first. Higher priority is typically given to QCIs that are related to voice calls. Such QCIs may include conversational voice, conversational video, V2X messages, VoLTE, etc.

Lastly, QCI controller 222, in response to the determination that the UE is in the undesired area and that the number of QCIs exceeds a pre-determined minimum when the UE is located in the undesired location, is responsible for disabling QCIs so the number of QCIs remaining assigned to the UE is at or below the pre-determined threshold. The QCI controller 222 may disable the QCIs assigned to the UE based on the priority of the QCIs assigned to the UE, disabling the lower priority QCIs first, thereby leaving only the highest priority QCIs assigned to the UE.

Figure 3:
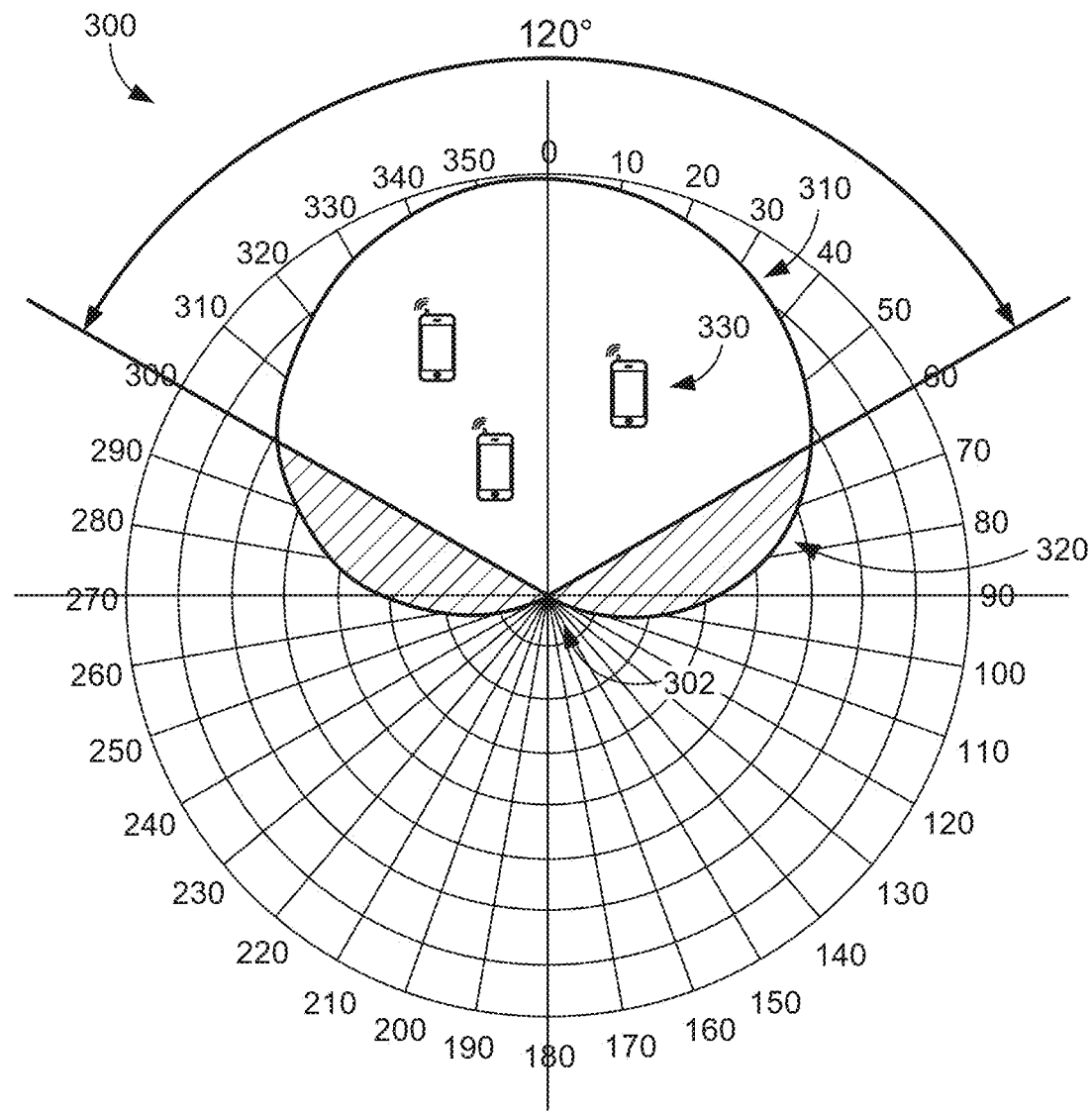
FIG. 3 depicts an exemplary schematic of the cell site, in accordance with an embodiment of the present invention.

Turning now to FIG. 3, exemplary multiple communication protocol environment 300 comprises cell site 302, which may include a first antenna array; one or more antennas; a desired area of a communication protocol 310; and an undesired area of the communication protocol 320. The location of the desired location is determined at least in part by the shape and size of the sector and the antenna array. In aspects, the one or more antennas may be dipole antennas, having a length, for example, of ¾, ½, 1, or 1¼ wavelength. In aspects, the first antenna array may be an active antenna array, FD-MIMO, massive MIMO, 3G, 4G, 5G, and/or 802.11. While we refer to dipole antennas herein, in other aspects, the one or more antennas may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array may comprise 64 antenna elements arranged in an 8×8 structure. In other aspects, the first antenna array may comprise antenna elements arranged in an 8×4, 4×8, or 4×4 configuration. Each antenna element of the first antenna array comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array may communicate or is capable of communicating with devices, using a 5G wireless communication protocol. While in this example 5G is mentioned as a wireless communication protocol, it should be understood that any wireless communication protocol standard may be utilized, for example, 3G, 4G, LTE, 5G, 802.11, or any other operator-elected wireless communication protocol standard. In the aspect, the first antenna array can include 64 antenna elements, each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array. In aspects, using the methods and systems disclosed herein with a high-density antenna array, such as the first antenna array, and using a 5G wireless communication protocol as an example, can facilitate the strategic assignment of beam indices and/or allotment of beam indices tailored for a specific purpose or environment.

In some embodiments, the receiver 216, in communication with the cell site 302, may detect when a UE enters an area covered by one or more antenna elements of an antenna array, e.g., the first antenna array of the cell site 302 of FIG. 3. In some embodiments, UEs may detect and/or measure one or more signals, e.g., synchronizations signals, from the antenna array when entering an area covered by the one or more antenna elements of the antenna array. As one example, UE 330 may have connection with the antenna array utilizing a first wireless communication protocol in the desired location 310. Additionally, the antenna array may detect that the UE 330 is communicating via the first communication protocol using one or more QCIs at any given time, each QCI having a particular ranking associated with it. In other words, as the UE 330 is connected with the antenna array in a desired location 310 the QCI controller will not disable any QCIs running on UE 330.

By way of example, as depicted by FIG. 3, detector 218 may detect that the sector or the cell site 302 has a desired location 310 and an undesired location 320, due to a high degree of interference or SINR in location 320. Consequently, QCIs would not be monitored for the UEs present in the desired location 310. Accordingly, the QCIs running on UE 330 would not be disabled while located in the desired location 310 of the antenna array.

Figure 4:
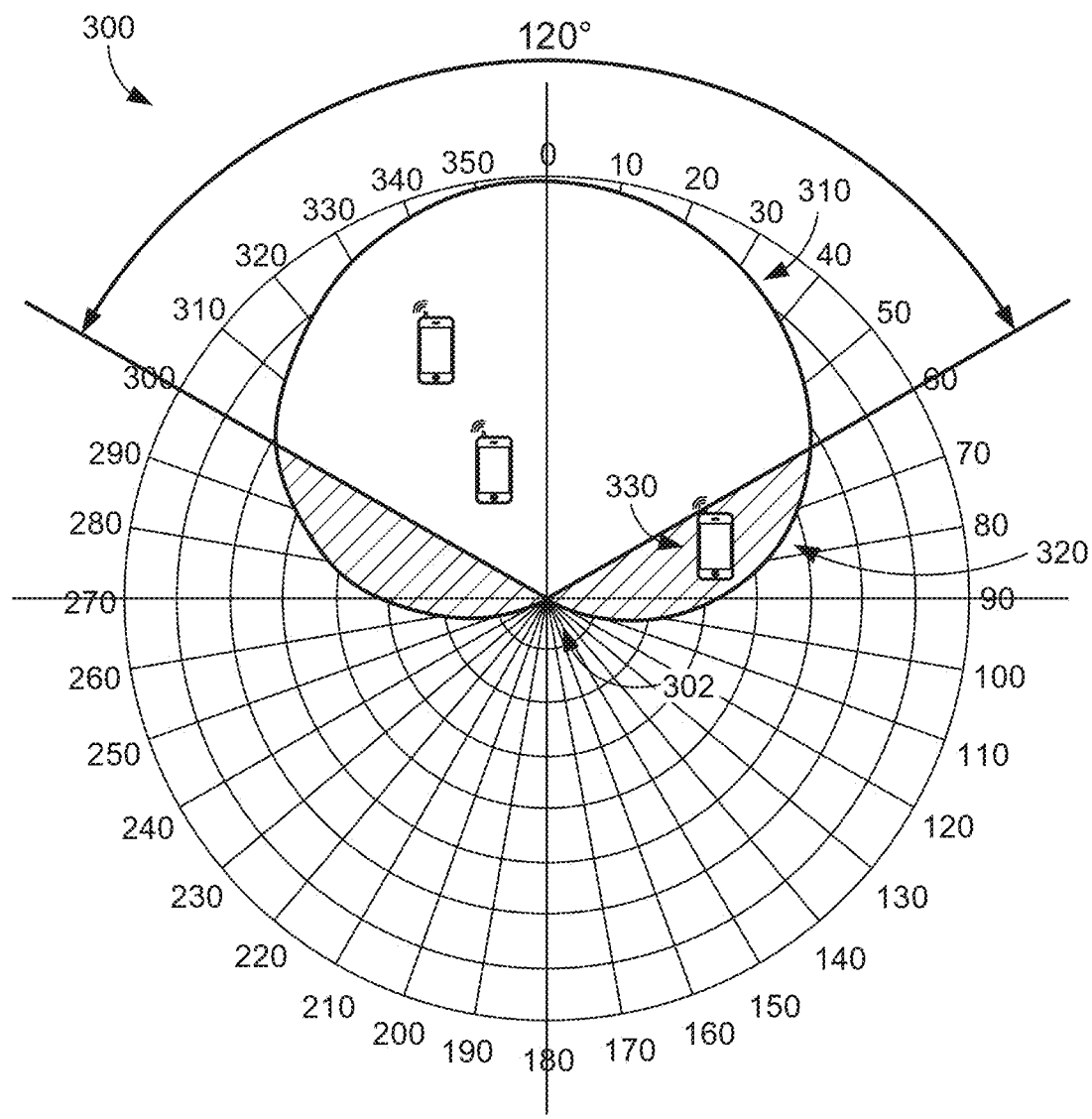
FIG. 4 depicts an exemplary schematic of the cell site, in accordance with an embodiment of the present invention.

By way of example, as depicted by FIG. 4, detector 218 may detect that the UE 330 may have connection with the antenna array utilizing the wireless communication protocol in an undesired location 320 of the antenna array. Further, determiner 220 may determine that the UE 330 is running only a single QCI. Accordingly, the UE 330 would have no QCIs disabled.

In another example, detector 218 may detect that the UE 330 may have connection with the antenna array utilizing the wireless communication protocol in an undesired location 320 of the antenna array. Further, determiner 220 may determine that the UE 330 is running multiple QCIs related to a variety of applications. Accordingly, the UE 330 would have all but the highest priority QCI disabled via QCI controller 222. A dynamic disablement in the QCIs of the UE 330 is in response to the determination of the priority of the QCIs running on UE 330 and determining which QCI has the highest priority. This priority is based on pre-established priority assignments for each QCI able to run on UE 330. As a further example, the QCIs determined to be running on UE 330 correspond to VoLTE and video conferencing. The QCI corresponding to VoLTE has a higher priority assigned to it and as such the QCI controller 222 would disable the QCI related to video conferencing when UE 330 is determined to be in the undesired location 320. In further embodiments, some QCIs are associated with a dual connectivity network such that when the UE 330 is found to be in the undesired location 320, the QCIs associated with E-UTRAN-New Radio Dual Connectivity (EN-DC) network are disabled. The E-UTRAN portion of the EN-DC corresponds to an LTE network and the New Radio portion of the EN-DC corresponds to a 5G radio network.

Figure 5:
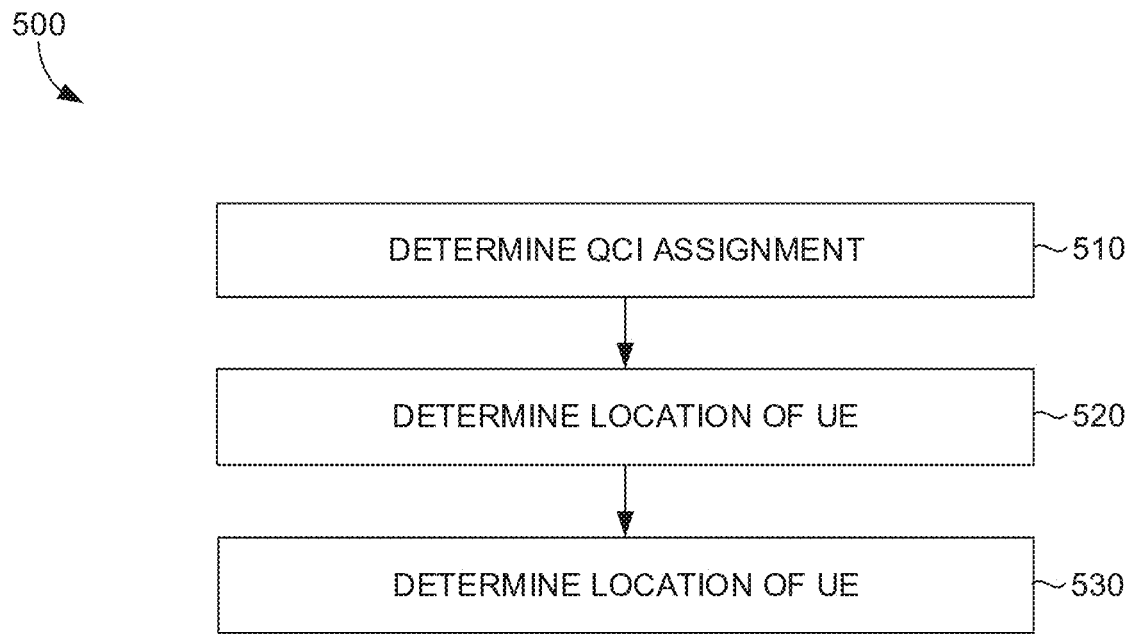
FIG. 5 depicts an exemplary method, in accordance with an embodiment of the present invention.

Turning now to FIG. 5, flow diagram 500 comprises an exemplary method dynamically disabling lower priority QCIs on a user device determined to be in an undesired location. Initially at block 510, it is determined that a first user device is assigned multiple QCIs, each QCI having a priority associated with it. At block 520, the location of the UE 330 is determined to be outside of a desired area. At block 530, disable all QCIs but the QCI with the highest priority value. This is done following the determination that the UE 330 is outside of a desired location and that multiple QCIs are assigned to the UE 330. By disabling the QCIs with lower priority, only the highest priority QCI is left enabled.

Figure 6:
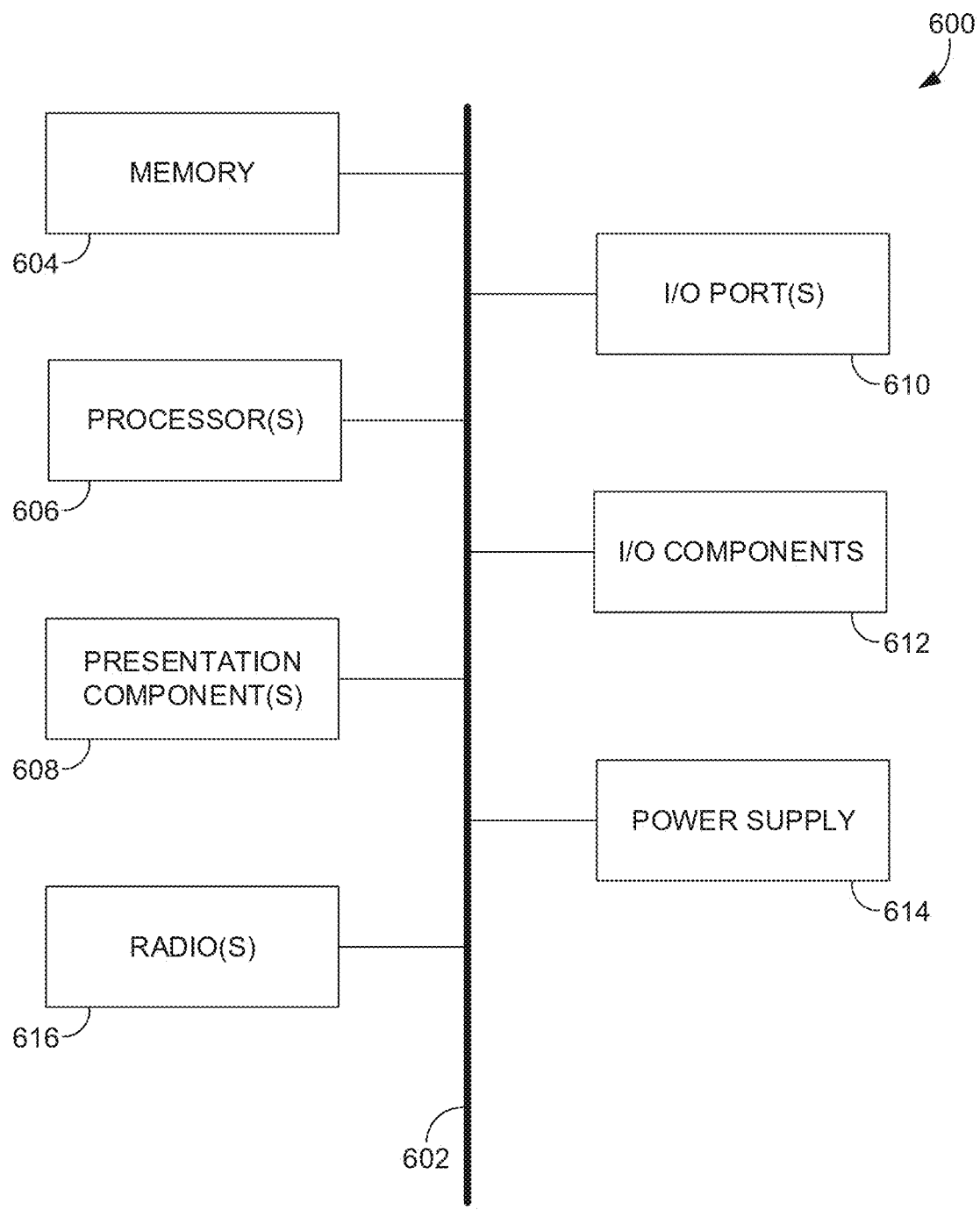
FIG. 6 depicts an exemplary computing device suitable for use in implementations of aspects herein.

Referring now to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, power supply 614 and radio(s) 616. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component, such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. Memory 604 may be removable, non-removable, or a combination thereof. Exemplary memory includes solid-state memory, hard drives, optical-disc drives, etc. Computing device 600 includes one or more processors 606 that read data from various entities, such as bus 602, memory 604, or U/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices, including I/O components 612, some of which may be built in computing device 600. Illustrative/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for managing user devices served by an antenna array, the method comprising:
    assigning that a first user device among a plurality of user devices is assigned a first Quality of Service Class Identifier (QCI) and a second QCI, each of the plurality of user devices being served by the antenna array;
    determining that the first user device is outside of a desired location of the antenna array; and
    based on a determination that the first user device is still being serviced by the antenna array and the first user device outside of the desired location of the antenna array, disabling the second QCI.

2. The media of claim 1, wherein the first QCI corresponds to VoLTE.

3. The media of claim 1, wherein the first QCI corresponds to voice calls.

4. The media of claim 1, wherein the second QCI corresponds to 5G network.

5. The media of claim 1, wherein the first QCI corresponds to an LTE portion of an E-UTRAN-New Radio Dual Connectivity concurrency network and the second QCI corresponds to a new radio portion of the E-UTRAN-New Radio Dual Connectivity concurrency network.

6. The media of claim 1, wherein the second QCI is lower in priority than the first QCI.

7. The media of claim 6, wherein the first QCI is assigned a higher priority than the second QCI based on the first QCI supporting voice calls and the second QCI not supporting voice calls.

8. A method for managing user devices served by an antenna array, the method comprising:
    assigning that a specific user device among a plurality of user devices being served by the antenna array is assigned a first QCI and a second QCI;
    determining that a first user device is outside of a desired location of the antenna array; and
    based on the determination that the first user device is still being serviced by the antenna array and the first user device outside of the desired location of the antenna array, disabling the second QCI.

9. The method of claim 8, wherein the first QCI corresponds to VoLTE.

10. The method of claim 8, wherein the first QCI corresponds to voice calls.

11. The method of claim 8, wherein the first QCI corresponds to an LTE portion of an EN-DC concurrency network and the second QCI corresponds to a new radio portion of the EN-DC concurrency network.

12. The method of claim 8, wherein the first QCI is QCI 1 or QCI 5 and the second QCI is QCI 9.

13. The method of claim 8, wherein the second QCI are lower in priority than the first QCI.

14. The method of claim 13, wherein the first QCI is assigned a higher priority than the second QCI based on the first QCI supporting voice calls and the second QCI not supporting voice calls.

15. The method of claim 8, wherein outside of the desired location is determined based on a determination that the specific user device is outside of a sector.

16. A system for managing user devices served by an antenna array, the system comprising:
    assigning that a user device among a plurality of user devices being served by the antenna array is assigned a first QCI and a second QCI;
    monitoring a location of the user device; and
    based on a determination that the first user device is still being serviced by the antenna array and the first user device outside of the desired location of the antenna array, disabling the second QCI.

17. The system of claim 16, wherein the second QCI is lower in priority than the first QCI.

18. The system of claim 17, wherein the first QCI is assigned a higher priority than the second QCI based on the first QCI supporting voice calls and the second QCI not supporting voice calls.

19. The system of claim 16, wherein the first QCI corresponds to voice calls.

20. The media of claim 16, wherein the first QCI corresponds to an LTE portion of an E-UTRAN-New Radio Dual Connectivity concurrency network and the second QCI corresponds to a new radio portion of the E-UTRAN-New Radio Dual Connectivity concurrency network.

* * * * *